United States Patent
Gersons et al.

(10) Patent No.: US 10,666,720 B2
(45) Date of Patent: May 26, 2020

(54) MAINTENANCE OF PERSISTENT MASTER IDENTIFIER FOR CLUSTERS OF USER IDENTIFIERS ACROSS A PLURALITY OF DEVICES

(71) Applicant: Free Stream Media Corp., San Francisco, CA (US)

(72) Inventors: Ruben Gersons, Amsterdam (NL); David de Jong, Amstelveen (NL)

(73) Assignee: Free Stream Media Corp., San Francisco, CA (US)

( * ) Notice: Subject to any disclaimer, the term of this patent is extended or adjusted under 35 U.S.C. 154(b) by 159 days.

(21) Appl. No.: 15/427,840

(22) Filed: Feb. 8, 2017

(65) Prior Publication Data

US 2018/0227387 A1 Aug. 9, 2018

(51) Int. Cl.
*G06F 15/16* (2006.01)
*H04L 29/08* (2006.01)
*G06F 15/173* (2006.01)

(52) U.S. Cl.
CPC .......... *H04L 67/1027* (2013.01); *H04L 67/22* (2013.01); *H04L 67/02* (2013.01); *H04L 67/306* (2013.01)

(58) Field of Classification Search
CPC ...... H04L 67/1027; H04L 67/22; H04L 67/02
USPC ....................................... 709/227
See application file for complete search history.

(56) References Cited

U.S. PATENT DOCUMENTS

| | | | | |
|---|---|---|---|---|
| 10,091,312 | B1* | 10/2018 | Khanwalkar | H04L 67/22 |
| 10,117,090 | B2* | 10/2018 | Jahangir | H04L 65/1016 |
| 2015/0058181 | A1* | 2/2015 | Lahtiranta | G06Q 30/0243 |
| | | | | 705/28 |
| 2016/0224901 | A1* | 8/2016 | Scarr | H04L 67/22 |
| 2017/0098245 | A1* | 4/2017 | Palanciuc | G06Q 30/0266 |
| 2018/0295133 | A1* | 10/2018 | Xu | H04L 29/08 |

* cited by examiner

*Primary Examiner* — Karen C Tang
(74) *Attorney, Agent, or Firm* — Procopio, Cory, Hargreaves & Savitch LLP

(57) ABSTRACT

A method for maintaining a persistent master identifier includes receiving a first plurality of clusters including a first plurality of user device identifiers and at least one first cluster attribute associated with the first plurality of identifiers. The first plurality of user device identifiers is stored as separate entries in a master table. Each entry includes at least a persistent master identifier, a user device identifier contained within the identified cluster, and the at least one attribute associated with the identifier. A second plurality of clusters including a second plurality of user device identifiers and at least one attribute associated with the second plurality of identifiers is received. Persistence of each entry in the master table is determined based on a comparison between the second plurality of clusters and the master table. The second plurality of clusters is selectively associated with a persistent master identifier based on the comparison.

20 Claims, 8 Drawing Sheets

US 10,666,720 B2

MAINTENANCE OF PERSISTENT MASTER IDENTIFIER FOR CLUSTERS OF USER IDENTIFIERS ACROSS A PLURALITY OF DEVICES

FIELD OF THE INVENTION

This specification is directed, in general, to an information processing system, and, more particularly, to maintenance of a persistent mast identifier for clusters of user identifiers across a plurality of electronic devices.

BACKGROUND OF THE INVENTION

Consumer electronic devices, such as desk-based and laptop computers, mobile phones, laptop computers, notebooks, tablets, MP3 players, connected TVs, etc., are ubiquitous. Part of the reason for the rapid growth in the number of mobile phones and other electronic devices is the rapid pace at which these devices evolve. More and more people are using multiple devices to access the internet. Through these devices they use browsers, apps or other methods to access content, interactive services and to communicate. Companies providing content can identify and track several user data points, such as the actual IP address, headers for webpage request and response, user's browsing history and various user device identifiers.

Typically, these user device identifiers are different across the various environments. In other words, one user may have many different user device identifiers also referred to herein as simply 'UIDs'. These UIDs are not constructed to remain constant and they have a certain 'lifespan' from less than a second to weeks or months. There is a need to create applications capable of recognizing the user as one individual person across devices, websites and applications. This problem is most pressing in the online advertising industry, where various applications focused on providing information related to the reach and frequency of a digital campaign are unable to provide accurate advertising metrics, optimizations and measurements without a cross-device view of the user.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for maintaining a persistent master identifier across a plurality of devices is provided. The method includes receiving a first plurality of clusters including a first plurality of user device identifiers that identifies at least one user device, and at least one first cluster attribute associated with each of the first plurality of user device identifiers. The first plurality of user device identifiers is stored as separate entries in a master table. Each entry in the master table includes at least a persistent master identifier uniquely identifying one of the plurality of clusters, a user device identifier contained within the identified cluster, and the at least one attribute associated with the user device identifier. A second plurality of clusters including a second plurality of user device identifiers that identifies at least one user device and at least one second cluster attribute associated with each of the second plurality of user device identifiers is received. Persistence of each entry in the master table is determined based on at least one comparison between the second plurality of clusters and the entries in the master table. The second plurality of clusters is selectively associated with a persistent master identifier based on the comparison.

BRIEF DESCRIPTION OF THE DRAWINGS

The accompanying appendices and/or drawings illustrate various, non-limiting, examples, inventive aspects in accordance with the present disclosure.

Figure 1:
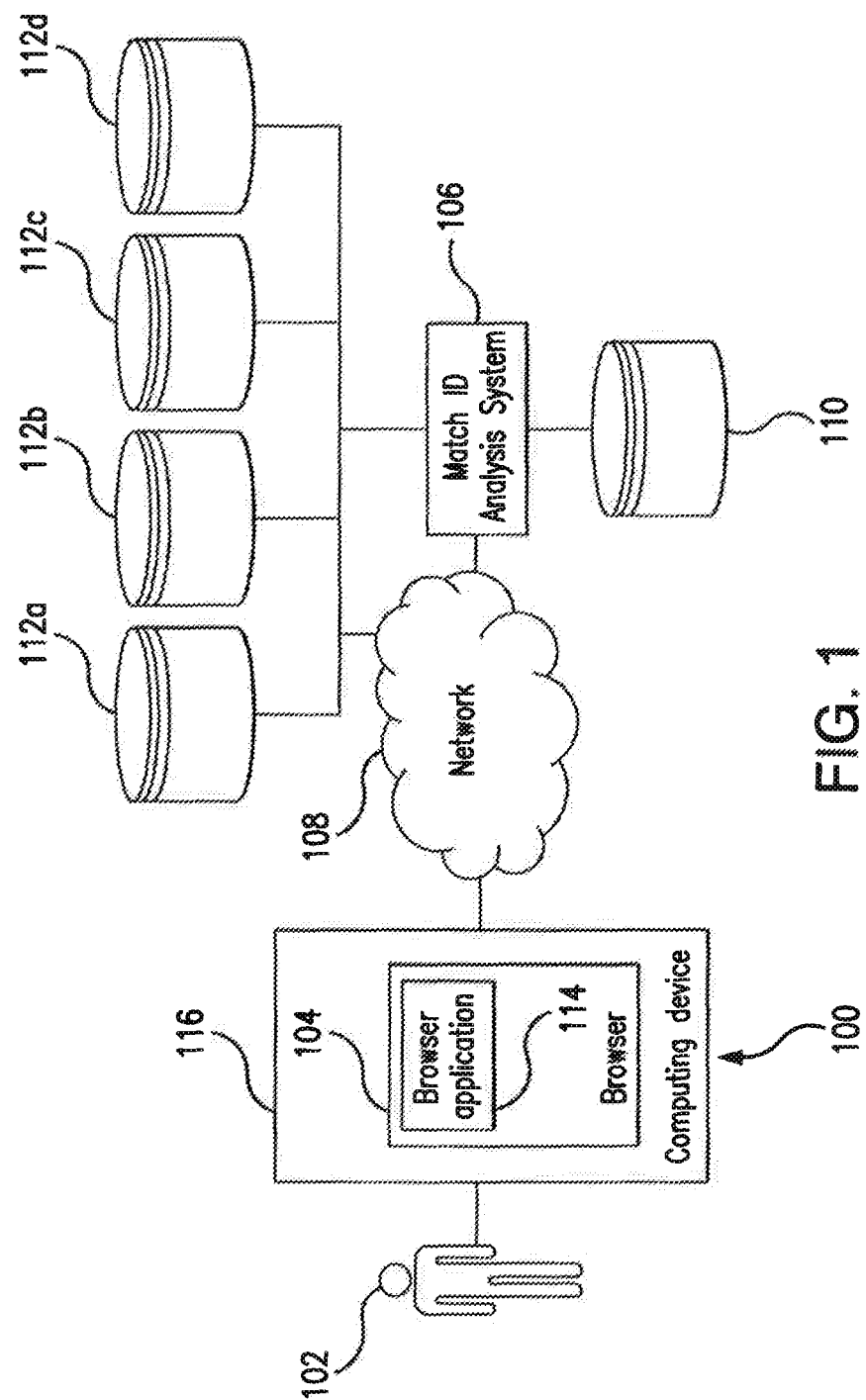
FIG. 1 is a block diagram illustrating an environment in which embodiments of the present invention may be practiced.

In the drawings like characters of reference indicate corresponding parts in the different figures. The drawing figures, elements and other depictions should be understood as being interchangeable and may be combined in any like manner in accordance with the disclosures and objectives recited herein.

DETAILED DESCRIPTION OF CERTAIN EMBODIMENTS

The illustrated embodiments described herein are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Any methods and materials similar or equivalent to those described herein may also be used to practice or test the instant disclosures and those inherent to the same.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below may preferably be implemented as a software algorithm, program or code residing on computer useable medium having control logic for enabling execution on a machine having a computer processor. Such a machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein may include such software to implement the equations, relationships, and algorithms described below. One skilled in the art will appreciate further features and advantages of the invention based on the above-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

The required architecture for a variety of these systems will appear from the description below. In addition, the exemplary embodiments may be implemented via any particular programming language suitable for use by those skilled in the art.

In addition, the language used in the specification has been principally selected for readability and instructional purposes, and may not have been selected to delineate or circumscribe the inventive subject matter. Accordingly, the instant disclosures are intended to be illustrative, but not limiting, of the scope of the invention, which is set forth in the following claims.

As noted above, there is a need to create applications capable of recognizing the user as one individual person across devices, websites and applications. To solve this problem, companies have therefore begun linking UIDs across environments, creating clusters of UIDs that (are likely to) belong to the same person. Clusters of matched UIDs may get assigned a unique Master Identifier that is used in systems as a cross-environment substitute ID for the UIDs created on a per-environment basis. However, UIDs are not static and do vary over time. UIDs may vary (e.g., new UIDs may appear and others may get lost over time), for example, due to cookie expiration or deletion, device ID resets and/or newly purchased devices. These continuous changes make it challenging to create a master identifier that is persistent and that is associated with the same person, while the related UIDs are changing over time.

One or more of the inventive embodiments relate to a method, system, and/or computer product for maintaining a persistent master identifier across a plurality of devices. In one embodiment, the method facilitates tracking of a persistent master identifier for volatile or distinct clusters of user identifiers that are attributed to belong to the same person. Further, in other embodiments, the method facilitates tracking user interactions with various systems/platforms across a plurality of devices and stores them in a separate database. Thereafter, the method compares different clusters that may be associated with a particular user and selectively assigns a persistent master identifier, based on the comparison.

FIG. 1 is a block diagram illustrating an environment 100 in which embodiments of the present invention may be practiced. Environment 100 may include one or more users such as a user 102; a browser 104; a MatchID analysis system 106; a network 108; an analysis data repository 110; and one or more servers 112 such as a merchant server 112a, a social network server 112b, a content 112c, and a bank server 112d. Servers 112 provide various details associated with user identifiers to MatchID analysis system 106, as described below. Browser 104 includes a browser application 114. The browser application 114 may execute on a computing device 116. The computing device 116 may be, for example, a laptop computer, desktop computer, ultrabook, tablet computer, mobile device, smart phone, smart TV, or server, among others. Browser application 114 can include executable file that runs outside browser 104 in computing device 116. The term "browser application" as used herein, includes, but is not limited to, mobile applications that run on smart phones, tablet computers, and other mobile or portable computing devices. Browser application 114 may allow user 102 to connect to services traditionally available on desktop or wireless platforms. Typically, these services access the Internet or intranet or cellular or wireless fidelity (Wi-Fi) networks, to access, retrieve, transmit and share data.

In various embodiments of the present invention, user 102 may use browser 104 to access one or more servers 112 via browser application 114 through network 108. Examples of browser 104 may include, but are not limited to, Microsoft® Internet Explorer, Mozilla Firefox®, Apple Safari®, Google® Chrome, and Opera®. Examples of network 108 may include wired network and wireless network. In some embodiments, user 102 may use browser 104 to shop for products online.

In an embodiment of the invention, user 102 is registered with each of the servers 112. One or more servers 112 such as a merchant server 112a, a social network server 112b, a content server 112c, and a bank server 112d may be located remotely from user 102.

Even though only one computing device 116 is shown in FIG. 1, users 102 may own more than one device. For example, user 102 may own a laptop and a smartphone. When the different computing devices 116, applications, software, software modules and/or other components access content (e.g., websites, services, and/or locations) online, one or more user device identifiers may be recorded, captured, and/or stored by servers 112 that host the content. For example, when a user 102 access a news website using a web browser application 114 on a smartphone 116, the servers 112 that host the news website may record the IP address of the computing device 116, other website header information (e.g., HTTP header information/fields), and an identifier for the web browser application (e.g., an identifier in a cookie for the website such as a cookie ID.

MatchID analysis system 106 interacts with various servers 112 to collect various information about a user/device, dynamically analyzes the information and facilitates tracking of a persistent master identifier (also referred to hereinafter as MatchID) for volatile or distinct clusters of user identifiers. In other words, the MatchID analysis system 106 is configured and operable to determine if particular user identifiers belong to the same person. Thousands of various data points may be compared by the MatchID analysis system 106 to finally come up with a link that particular UIDs belong to the same user.

In an embodiment, MatchID analysis system 106 interacts with servers 112 either continuously or at pre-defined intervals of time to retrieve information regarding one or more users 102. The information may include, but is not limited to, IP address and user ID/device ID associated with user 102, user ID type, user activity information (e.g., time information related to a particular event), and user agent information. In an embodiment of the invention, the pre-defined interval of time may be an hour, a day, a week, or longer. In an embodiment of the invention, MatchID analysis system 106 may automatically receive data feeds from various servers such as 112a, 112b, and 112c.

MatchID analysis system 106 stores the retrieved information (e.g., clusters of user identifiers) in analysis data repository 110. Data repository 110 may include one or more databases, such as relational databases.

As user 102 performs an activity on browser 104, browser application 114 may track the activity. In one embodiment, browser application 114 tracks the activity based on the context of browser 104. The tracked activity is sent to one or more servers 112 via network 108. Examples of the context of browser 104 may include, but are not limited to, the website Uniform Resource Locator (URL), the website, the content of a webpage, a search query, the configuration of the browser, and configuration of the computing device associated with a user, such as IP address, type of operating system, type of computing device, etc. facilitating user's interactions with one or more servers 112.

Further, tracking of cross-environment user identifiers are explained in greater detail below.

Figure 2:
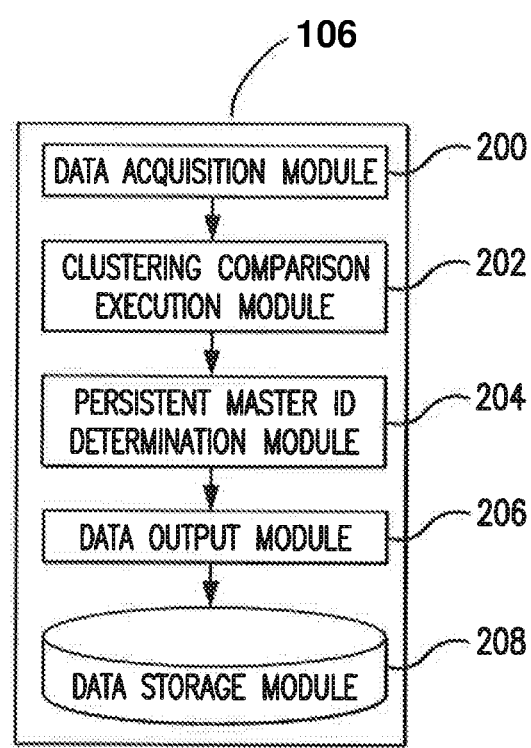
FIG. 2 is a block diagram illustrating the MatchID analysis system of FIG. 1, according to one embodiment of the present invention.

FIG. 2 is a block diagram illustrating the MatchID analysis system of FIG. 1, according to one embodiment of the present invention. MatchID analysis system 106 may include one or more software modules. The software modules may comprise a software program or set of instructions executed by a processor. According to the illustrative embodiment of FIG. 2, the software modules may include a data acquisition module 200, a clustering comparison execution module 202, a persistent master ID determination module 204, a data output module 206 and/or a data storage module 208.

According to this embodiment, the data acquisition module 200 may be generally configured and enabled to receive or extract user data related to user identifiers. Such data and information can be received/retrieved from each server 112 periodically, for example, at predetermined periods of time. As noted above, the received/retrieved information may include, for example, IP address and user ID associated with user 102, user ID type, various attributes and heuristics information associated with user IDs, user activity information (e.g., time information related to a particular event), user agent profile information and the like. The received information is then sent to the data storage module 208 or to clustering comparison execution module 202. As described below, the clustering comparison execution module 202 may be generally configured and enabled to compare each of the received candidate clusters with a plurality of previously received clusters that are stored in a master table to find matching ones. Next, the clustering comparison execution module 202 passes results of such comparison to the persistent master ID determination module 204. In an embodiment, the persistent master ID determination module 204 determines a degree of overlap of user identifiers or attributes between matching clusters for all matching combinations of stored clusters and candidate clusters. The persistent master ID determination module 204 may be generally configured and enabled to selectively assign a persistent master identifier to the candidate cluster having the highest degree of overlap with a corresponding cluster stored in the master table, as described below. According to another exemplary embodiment, when all data received by the data acquisition module 200 is processed, the data output module 206 may be generally configured and operable to output the result data back to one or more servers 112, as described below. The data storage module 208 may be implemented mainly by the data repository 110 operatively connected to the MatchID analysis system 110.

Figure 3:
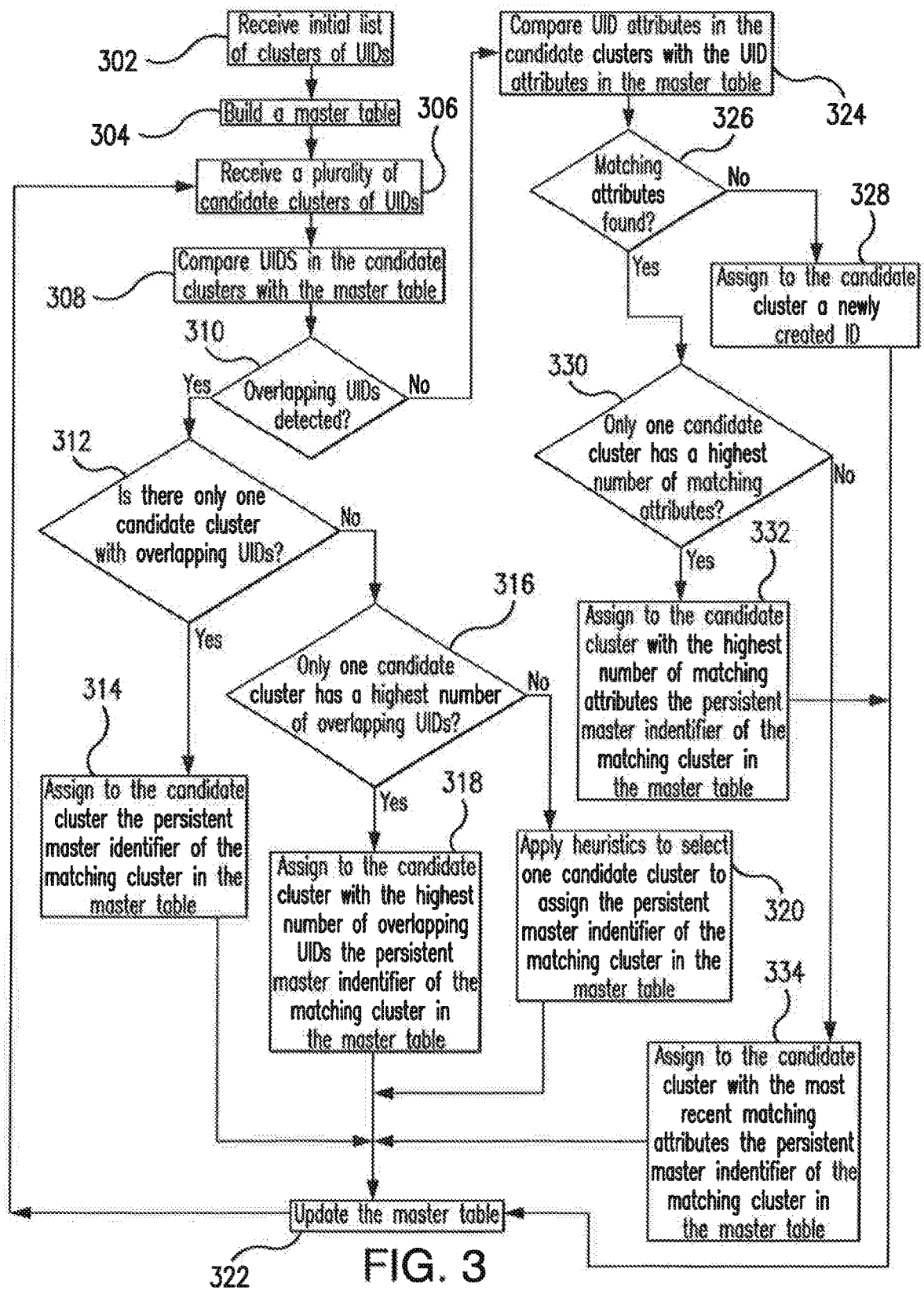
FIG. 3 is a flowchart illustrating an example of a flow of processing performed by the MatchID analysis system of FIG. 1, in accordance with illustrative embodiments of the present invention.

According to the illustrative embodiment of FIG. 3, a method for monitoring performance of customized applications in a computer network may be depicted in diagram form. Before turning to description of FIG. 3, it is noted that the flow diagrams shown therein are described, by way of example, with reference to components shown in FIGS. 1 and 2, although these operational steps may be carried out in any system and are not limited to the scenario shown in the aforementioned figure. Additionally, while an illustrative flow diagram, such as that illustrated by in the FIG. 3 embodiment, may show operational steps carried out in a particular order, as indicated by the lines connecting the blocks, the various steps shown in these diagrams can be performed in any combination or sub-combination consistent with the disclosures provided herein. It should be appreciated that in some embodiments some of the steps described below may be combined into a single step. In some embodiments, one or more additional steps may be included.

Initially, at step 302, the MatchID analysis system 106 (e.g., the data acquisition module 200) receives an initial list of clusters of user identifiers. In one embodiment, this initial list may be in the form of a device graph. For example, the device graph represented by the cluster 402 in FIG. 4 includes three user device identifiers, user device identifier A 402a, user device identifier B 402b and user device identifier C 402c. As discussed above, the user device identifier may be an identifier used by a device when the device accesses content (e.g., accesses a news website). User device identifier A is a cookie ID for a browser application on a smartphone, user device identifier B is a device identifier for a computing device that has been hashed using, for example, the Message Digest-5 (MD-5) hashing function/algorithm, user device identifier C is a device identifier for a computing device that has been hashed using another hash algorithm, such as, for example, the Secure hash algorithm-1 (Sha-1) hashing function/algorithm. Those skilled in the art may implement such other algorithms with equal or substantially similar functionality as those hash algorithms described.

In the device graph, a user device identifier may represent a device that is associated with the user device identifier (e.g., may represent the device that is using the user device identifier). In one embodiment, a device may be a computing device 116 and/or an application, software, software modules, and/or other components on the computing device 116. For example, the device may be one or more of a desktop computer, a laptop computer, a server computer, a PDA, smartphone, web-enabled television set, smart television set, a gaming console, a connected car, and/or any other device capable of processing, managing and/or transmitting data. In another example, the device may be software, a software module, an application, and/or other component on a computing device.

Each device (e.g., each computing device and/or each software or application) may have one or more user device identifiers. For example, a smartphone (e.g., a device) may have a MAC address, a serial number (e.g., a serial number from a manufacturer), an Open Device Identification Number (ODIN), a Unique Device Identifier (UDID), an OpenUDID, a Globally Unique Identifier (GUID), an IMEI number, etc., which may each be user device identifiers. In another example, applications, software, and/or software modules may also have user device identifiers. For example, an application on a computing device may have a serial number which may be the user device identifier for the application. In another example, a web browser application may have cookie which includes an identifier and the identifier in the cookie (e.g., the cookie ID) may be the user device identifier for the web browser application. In other embodiments, user device identifiers may include, but are not limited to, a MAC addresses, IMEI numbers, serial numbers, ODINs, UDIDs, OpenUDIDs, GUIDs, cookie IDs, an iOS® IDFA, an Identifier for Vendors (IDFV), and/or any other data/information which may be used to identify a device (e.g., an application, software, and/or a computing device). In one embodiment, a user device identifier may be a number (e.g., 734598238742), an alphanumeric value (e.g., A984FDSJL334), a string of characters (e.g., HZ$98!324*J), or any type of value that may be used to identify a device (e.g., an application, software, and/or a computing device).

In one embodiment, a device (e.g., a computing device, an application, software, a software module, etc.) may generate a user device identifier. For example, when the application (e.g., a device) is installed onto the computing device the application (or an installer/install file for the application) may generate a user device identifier based on a MAC address for the computing device. In another example, a computing device (e.g., a device, such as a smartphone), may generate a user device identifier based on other identifiers for the computing device (e.g., the smartphone may generate a user device identifier based on an IMEI number or a UDID for the smartphone). In some embodiments, the device (e.g., a computing device, an application, etc.) may use a variety methods, algorithms, operations, and/or functions, to generate user device identifiers. For example, an application on a computing device may use a cryptographic hash function (e.g., SHA-1, Secure Hash Algorithm-2 (SHA-2), MD-5, etc.) to generate a user device identifier for the application based on an IMEI for the computing device. In another example, a computing device (e.g., a tablet computer) may use a random number generator (e.g., a Pseudo-Random Number Generator (PRNG)) to generate a device identifier based on a MAC address for the computing device.

According to an embodiment of the present invention, in addition to receiving user identifier information, at step 302, the MatchID analysis system 106 may receive other information associated with the plurality of user identifiers. Such information may include, but is not limited to, one or more attributes associated with each of the user identifiers, one or more user activity events having corresponding IP addresses and time stamps associated with user identifiers, user agent strings associated with the received events, and the like. As a non-limiting example, the user agent string may include various device specific information—"Mozilla/[version] ([system and browser information]) [platform] ([platform details]) [extension s]".

Referring back to FIG. 3, at step 304, once the initial list of clusters is received the MatchID analysis system 106 builds a master table based on the received device graph. Each entry in the master table includes at least a persistent master identifier (MatchID) that uniquely identifies on the plurality of received clusters, a user identifier (User ID) contained within the cluster identified by the MatchID and one or more attributes associated with the user identifier. Table 1 below illustrates a simplified version of the master table that can be built by the MatchID analysis system 106:

TABLE 1

| MatchID | User ID | IP Addresses | Model | Timestamp |
|---------|---------|--------------|-------|-----------|
| 123 | A | 1.2.3.4 | iPhone7 | 2016-01-06 20:34:25 UTC |
| | | 2.3.4.5 | | 2016-01-08 18:29:25 UTC |
| | | 3.4.5.6 | | 2016-01-23 23:49:39 UTC |
| 123 | B | 1.2.3.4 | MacBook | 2016-01-16 20:34:25 UTC |
| | | 2.3.4.5 | | 2016-01-26 00:43:32 UTC |
| 123 | C | 1.2.3.4 | GalaxyTab | 2016-01-26 22:03:25 UTC |

Figure 4:
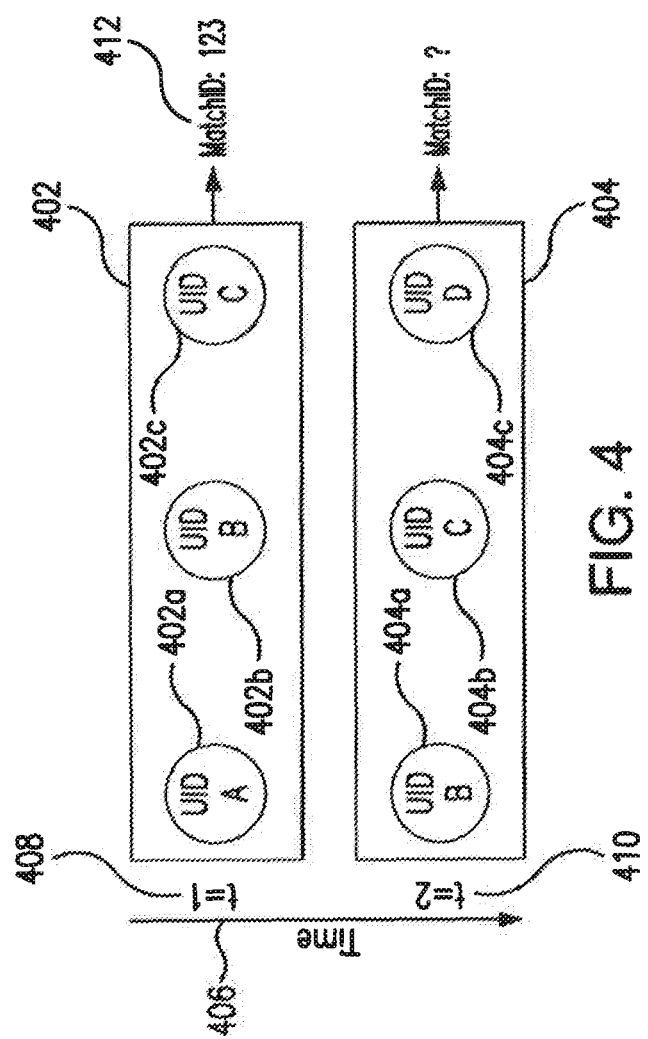
FIG. 4 is an example of two different clusters of user identifiers associated with two different instances in time, in accordance with illustrative embodiments of the present invention.

As noted above, generally, clusters of user identifiers within a device graph are not static. New user IDs may appear and others may get lost over time in various device graphs, for example, due to cookie expiration or deletion, device ID resets and/or newly purchased devices. According to an embodiment, the MatchID analysis system 106 may periodically pull or receive from one or more servers 112 additional user identifier information as another plurality of clusters of user identifiers, referred to hereinafter as candidate clusters, for example, in the form of another device graph (step 306). FIG. 4 is an example of two different clusters of user identifiers associated with two different instants of time, in accordance with illustrative embodiments of the present invention. In FIG. 4, a first cluster 402 represents a cluster already stored in the master table. This cluster includes user identifiers A (402a), B (402b) and C (402c) may be associated with a persistent master identifier 412 uniquely identifying this cluster. A second cluster 404 shown in FIG. 4 represents an exemplary candidate cluster received by the MatchID analysis system 106 at step 306. The second cluster 404 includes another plurality of user identifiers 404a-404c. User identifier D 404c may comprise an iOS® Identifier For Advertisers (IDFA), for example. It should be noted that clusters 402 and 404 are associated with different time instants. The first cluster 402 may be associated with a first time instant 408, while the second cluster 404 may be associated with a second time instant 410. The MatchID analysis system 106 is configured to determine whether the second cluster is associated with the same user as the first cluster 402, and if so assign the same persistent master identifier 412 to the second cluster. FIG. 4 shows one candidate cluster 404 for illustrative purposes only. At step 306, the MatchID analysis system 106 may include thousands or even millions of candidate clusters.

Referring back to FIG. 3, at step 308, the MatchID analysis system 106 (e.g. clustering comparison execution module 202) may compare each of the plurality of candidate clusters with one or more clusters in the master table (Table 1) to identify matching user device identifiers. The results of the comparison are then analyzed by the MatchID analysis system 106 to determine which candidate clusters belong to the same person as clusters stored in the master table. More specifically, at step 310, the MatchID analysis system 106 determines if any matching is successful. In response to determining that matching was successful (decision block 310, "Yes" branch), at step 312, the MatchID analysis system 106 determines if there is only one candidate cluster having user identifiers overlapping with identifiers contained in a particular cluster in the master table (step 312). If so (decision block 312, "Yes" branch), the MatchID analysis system 106 assigns the persistent master identifier of the matching cluster in the master table to the matching candidate cluster.

Figure 5:
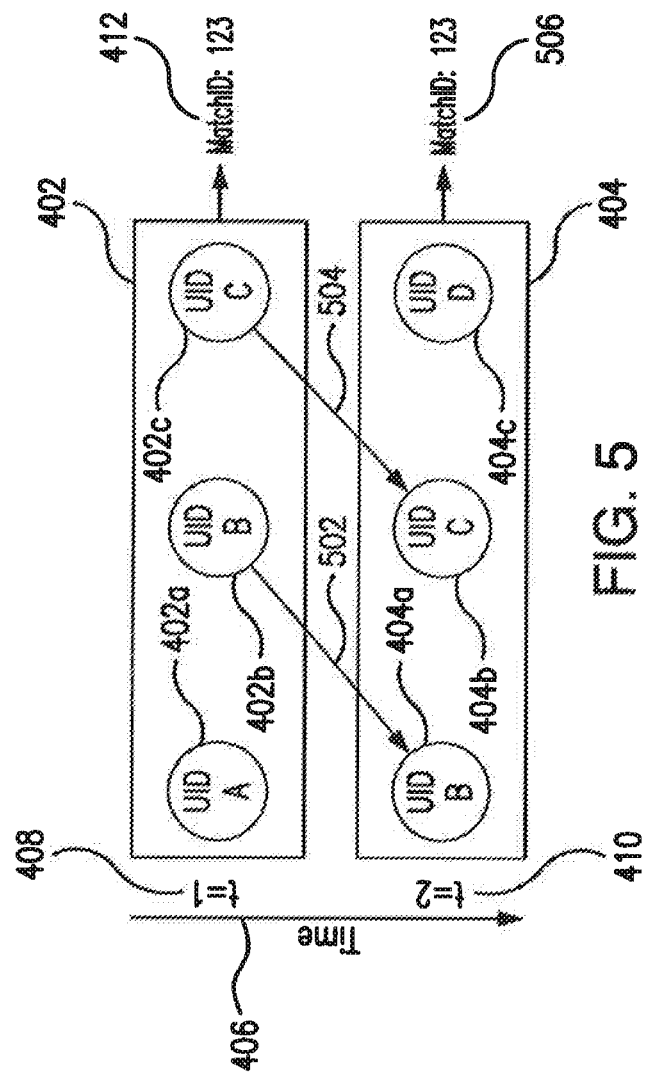
FIG. 5 is an example illustrating association of a persistent master identifier with a candidate cluster in a case where there is only one candidate cluster with overlapping UIDs, in accordance with illustrative embodiments of the present invention.

According to the illustrative embodiment of FIG. 5, a persistent master identifier may be associated with a candidate cluster in a case where there is only one candidate cluster with overlapping UIDs, in accordance with illustrative embodiments of the present invention. FIG. 5 shows clusters 402 and 404 discussed above in conjunction with FIG. 4. In this figure, a first link 502 represents a match between the user identifier B 402b of the first cluster 402 and the user identifier B 404a of the second cluster 404, while a second link 504 represents a match between the user identifier C 402c of the first cluster 402 and the user identifier C 404b of the second cluster 404. If the second cluster 404 is the only candidate cluster having user identifiers matching the identifiers of the first cluster 402, then the MatchID analysis system 106 decides that clusters 402 and 404 belong to the same user, assigns the persistent master identifier 506 of the first cluster 402 to the second cluster 404 (step 314) and updates the master table (step 322). Table 2 below illustrates such update made to the master table (Table 1):

TABLE 2

| MatchID | User ID | IP Addresses | Model | Timestamp |
| --- | --- | --- | --- | --- |
| 123 | D | 1.2.3.4 3.4.5.6 | iPhone7 | 2016-01-07 20:45:24 UTC 2016-02-12 00:55:44 UTC |
| 123 | B | 1.2.3.4 2.3.4.5 | MacBook | 2016-01-16 20:34:25 UTC 2016-01-26 00:43:32 UTC |
| 123 | C | 1.2.3.4 | GalaxyTab | 2016-01-26 22:03:25 UTC |

In other words, in this case, the entry associated with the user identifier D (404c) replaces the entry associated with the user identifier A (402a) within the first cluster 402 stored in the master table. It should be noted that an entry associated with the user identifier A (402a) may stay in the master table for a predetermined period of time before being purged by the MatchID analysis system 106.

Referring back to FIG. 3, in response to determining that there is more than one candidate cluster having overlapping user identifiers with the first cluster 402 (decision block 312, "No" branch), at step 316, the MatchID analysis system 106 determines whether only one candidate cluster has a highest number of user identifiers overlapping with the user identifiers of the first cluster 402. If so (decision clock 316, "Yes" branch), the MatchID analysis system 106 assigns the persistent master identifier of the matching cluster in the master table to the candidate cluster with the highest number of overlapping user identifiers (step 318).

Figure 6:
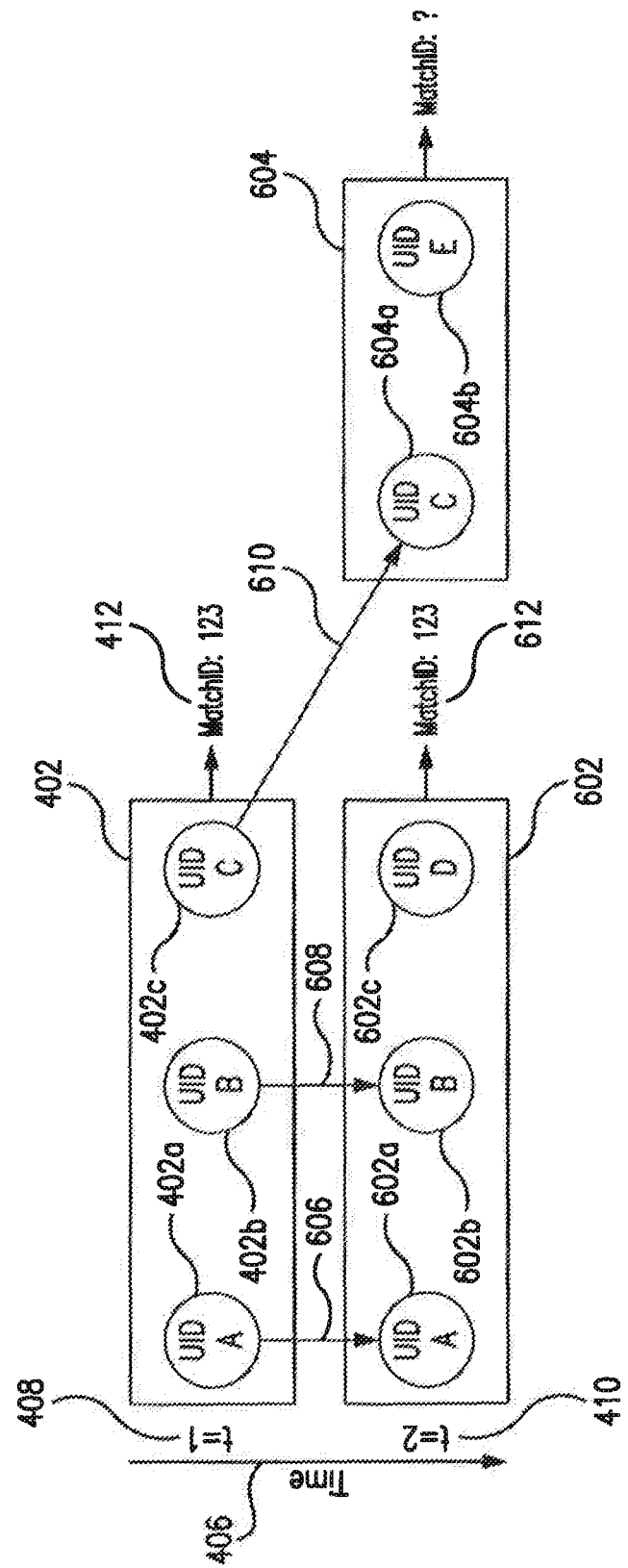
FIG. 6 is an example illustrating association of a persistent master identifier with a candidate cluster in a case where there is more than one candidate cluster with overlapping and only one candidate cluster having the highest number of overlapping UIDs, in accordance with illustrative embodiments of the present invention.

In the illustrative embodiment of FIG. 6, a persistent master identifier may be associated with a candidate cluster in a case where there is more than one candidate cluster with overlapping labs and only one candidate cluster having the highest number of overlapping UIDs, in accordance with illustrative embodiments of the present invention. The first cluster 402 includes user identifiers A (402a), B (402b) and C (402c) stored in the master table. A third cluster 602 and a fourth cluster 604 represent candidate clusters received by the MatchID analysis system 106 in step 306 and identified as having at least one matching user identifier. The third cluster 602 includes user identifiers A (602a), B (602b) and C (602c), while the fourth cluster 604 includes only two user identifiers—user identifier C (604a) and user identifier E (604b). In one embodiment, the user identifier F may be a cookie ID for a browser application on a MacBook device. However, the third cluster 602 has two user identifiers 602a and 602b overlapping with two user identifiers 402a and 402b in the first cluster 402 (overlaps represented by links 606 and 608), while the fourth cluster 604 includes only one user identifier C (604a) overlapping with one user identifier C (402c) of the first cluster 402 (represented by the link 610). Since the third cluster 602 has the highest number of overlapping identifiers, the MatchID analysis system 106 decides that clusters 402 and 602 belong to the same user, assigns the persistent master identifier 412 of the first cluster 402 to the persistent master identifier 612 of the third cluster 602 (step 318) and updates the master table (step 322). Table 3 below illustrates such update made to the master table (Table 1):

TABLE 3

| MatchID | User ID | IP Addresses | Model | Timestamp |
| --- | --- | --- | --- | --- |
| 123 | A | 1.2.3.4 2.3.4.5 3.4.5.6 | iPhone7 | 2016-01-06 20:34:25 UTC 2016-01-08 18:29:25 UTC 2016-01-23 23:49:39 UTC |
| 123 | B | 1.2.3.4 2.3.4.5 | MacBook | 2016-01-16 20:34:25 UTC 2016-01-26 00:43:32 UTC |
| 123 | D | 1.2.3.4 3.4.5.6 | iPhone7 | 2016-01-07 20:45:24 UTC 2016-02-12 00:55:44 UTC |

In other words, in this case, the entry associated with the user identifier D (404c) replaces the entry associated with the user identifier C (402c) within the first cluster 402 stored in the master table. Furthermore, the entry associated with the user identifier C (402c) may now be associated with the fourth cluster 604.

Figure 7:
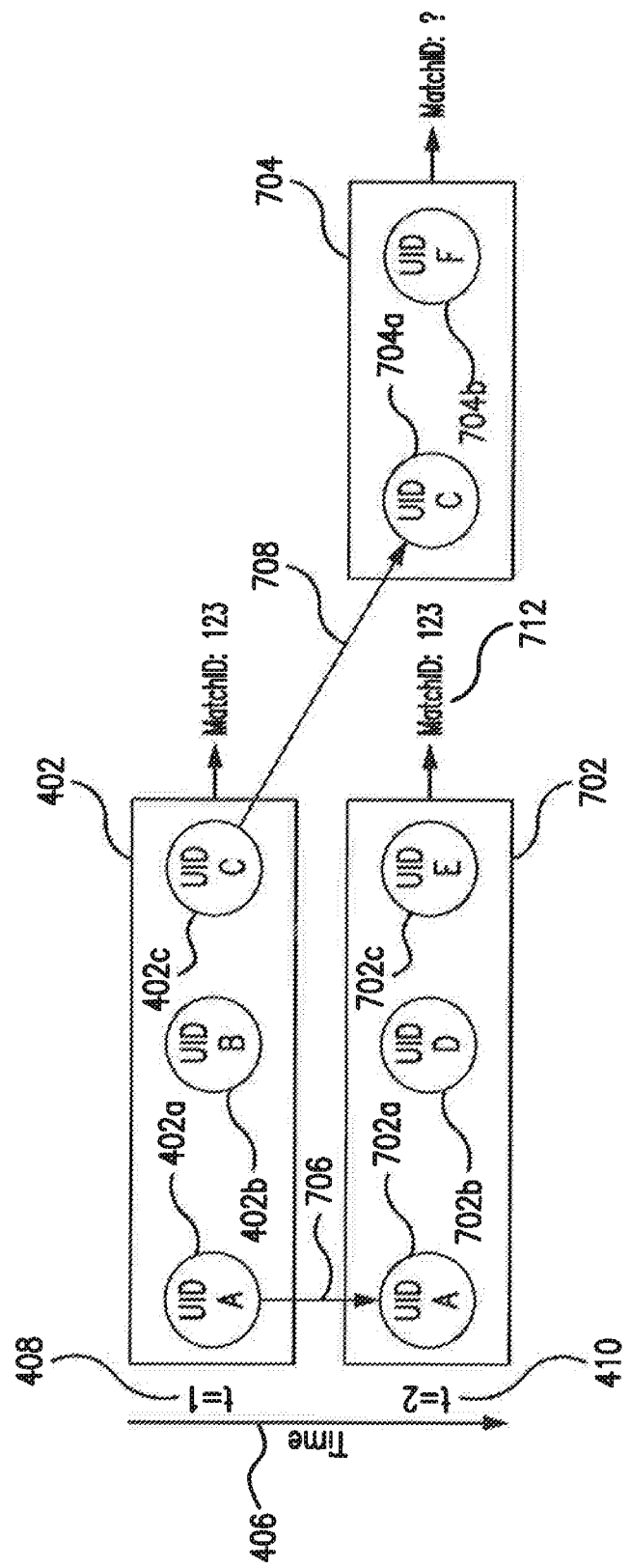
FIG. 7 is an example illustrating association of a persistent master identifier with a candidate cluster in a case where there is more than one candidate cluster with overlapping UIDs and more than one candidate duster having the highest number of overlapping UIDs, in accordance with illustrative embodiments of the present invention.

In the illustrative embodiment of FIG. 7, a persistent master identifier may be associated with a candidate cluster in a case where there is more than one candidate cluster with overlapping UIDs and more than one candidate cluster having the highest number of overlapping UIDs, in accordance with illustrative embodiments of the present invention. In addition to the first cluster 402, FIG. 7 shows a fifth cluster 702 and a sixth cluster 704 representing candidate clusters received by the MatchID analysis system 106 in step 306 and identified as having at least one matching user identifier. The fifth cluster 702 includes user identifiers A (702a), D (702b) and E (702c), while the sixth cluster 704 includes identifiers C (704*a*) and F (704*b*). In one embodiment, the user identifier F may be a cookie ID for a browser application on an iPhone device. In this case the fifth 702 and sixth 704 clusters have the same number of matching identifiers (1), represented by links 706 and 708 in FIG. 7.

According to an embodiment of the present invention, referring back to FIG. 3 yet again, in response to determining that there is more than one candidate cluster having the highest number of overlapping user identifiers with the first cluster 402 (decision block 316, "No" branch), at step 320, the MatchID analysis system 106 may employ additional heuristics information in conjunction with the user device identifiers to associate two or more clusters to the same user. Such additional heuristics information may be advantageous in situations in which there is a tie between the candidate clusters having a highest number of matching user device identifiers (such as situation shown in FIG. 7). In an example, the heuristic information is a user identifier type heuristic that specifies a type of user identifier included in each cluster. In an embodiment, the MatchID analysis system 106 may employ one or more weighting factors, with stronger weights being associated with stronger user device identifiers. For example, the MatchID analysis system 106 may associate stronger weights with the device, application or system based user identifiers as compared to cookie based user device identifiers.

As another heuristics information example, location information, such as GPS location information, reverse Internet Protocol (IP) address mapping, and/or other information, may be employed as a weighting factor, with stronger weights being associated with user devices identifiers of the candidate clusters that are located in the same general geographic area as user device identifier of the cluster stored in the master table. Further, in cases in which such a weighting factor is low or not available (thus indicating that two separate user devices are not physically located closely to each other), the weighting factor may not reduce the effect of user device identifiers that indicate a strong association of the two or more user devices to the same user. In such cases, different user devices of the same user may be purposely positioned in different locations (e.g., due to the user travelling and leaving one of the user devices at home) or the user may employ different Internet services for different user devices.

In other examples, additional heuristics information may include explicit identifiers obtained from third-party authentication services, such as those offered by Facebook® or Google®, which may be used to more correctly select two or more clusters associated to the same user. In a further example, the heuristic information may indicate the cluster having the highest number of user device identifiers. In an embodiment of the present invention, if none of the heuristics information helps to break the tie between candidate clusters, the MatchID analysis system 106 may randomly select one of the candidate clusters at step 320.

If matching the obtained candidate cluster's user device identifiers to respective user device identifiers in the clusters stored in the master table does not yield any matching candidate clusters (decision block 310, "No" branch), at step 324 the MatchID analysis system 106 compares attributes of user device identifiers in the candidate clusters to respective attributes of user device identifiers included in the clusters stored in the master table. In an example, the attributes may include the device models and visited IP addresses associated with each user device identifier in each cluster. Device models are typically names or codes that may be used as labels to distinguish one type of device from another. In a non-limiting example, device models may include iPhone_iOS10.3, PC_Window10.1 or GalaxyS7. The MatchID analysis system 106 may be configured to extract device model information from the aforementioned user agent string. In one embodiment, the MatchID analysis system 106 may store both the device models and visited IP address information as part of an entry stored in the master table (as shown in Tables 1-3) above.

Figure 8:
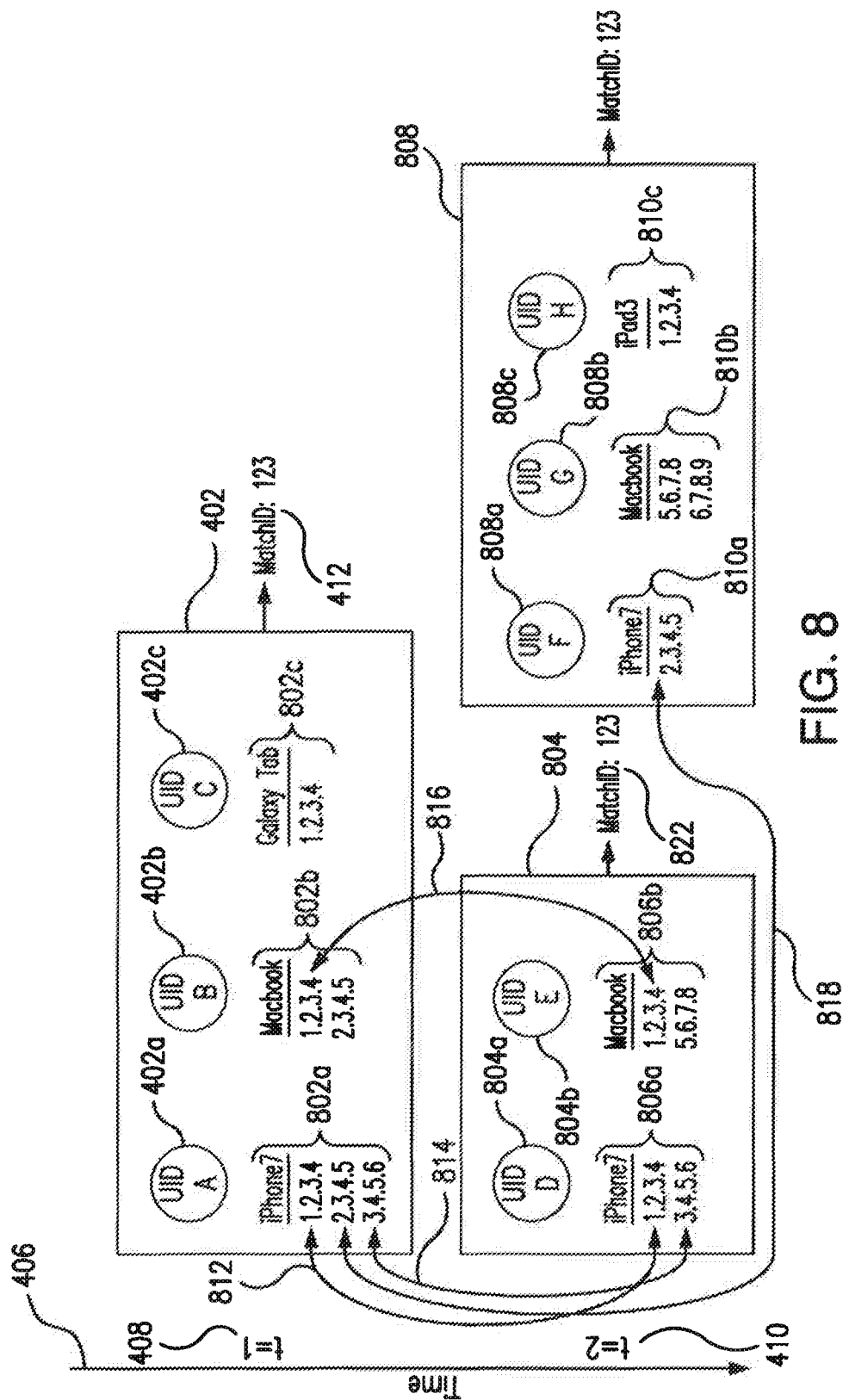
FIG. 8 is an example illustrating association of a persistent master identifier with a candidate cluster based on matching attributes associated with UIDs in a case where there are no overlapping UIDs, in accordance with illustrative embodiments of the present invention.

In the illustrative embodiment of FIG. 8, a persistent master identifier is associated with a candidate cluster based on matching attributes associated with UIDs in a case where there are no overlapping UIDs, in accordance with illustrative embodiments of the present invention. FIG. 8 shows a seventh cluster 804 and an eighth cluster 808 representing candidate clusters received by the MatchID analysis system 106 in step 306. The seventh cluster 804 includes user identifiers D 804*a* and E 804*b*, while the eighth cluster 808 includes identifiers F (808*a*), G (808*b*), and H (808*c*). None of these identifiers match the identifiers A (402*a*), B (402*b*), and C (402*c*) stored in the cluster 402. Furthermore, FIG. 8 illustrates various attributes associated with each identifier. For example, the attributes 802*a*-802*c* are shown as part of the first cluster 402 and are associated with respective identifiers 402*a*-402*c*, the attributes 806*a* and 806*b* are associated with the identifiers D 804*a* and E 804*b* (seventh cluster 804) and the attributes 810*a*-810*c* are associated with the identifiers F (808*a*), G (808*b*), and H (808*c*) (eighth cluster 808).

According to an embodiment of the present invention, step 324 performed by the MatchID analysis system 106 involves comparing combinations of attributes 806*a*-806*b* and 810*a*-810*c* of candidate clusters to combinations of attributes 802*a*-802*c* of clusters stored in the master table. At 326, the MatchID analysis system 106 determines if a match exists between the corresponding attributes. In certain example embodiments, if no match is found (decision block 326, "No" branch), then the MatchID analysis system 106 may assign a newly generated persistent master identifier to each candidate cluster having no matching attributes. However, if a match is found (decision block 326, "Yes" branch), at 330, the MatchID analysis system 106 determines if only one candidate cluster has the highest number of matching attributes at 330. In the example shown in FIG. 8, the links 812, 814 and 816 represent matches between user device identifier attributes 802*a* and 806*a* of the first cluster 402 and user device identifier attributes 802*b* and 806*b* of the seventh cluster 804, respectively, while the link 818 shows matching user device identifier attributes 802*a* of the first cluster 402 and attributes 810*a* of the eighth cluster 808. Since the seventh cluster 804 has the highest number of matching attributes, in step 332, the MatchID analysis system 106 assigns the persistent master identifier 822 to the seventh cluster 804.

According to some embodiments of the present invention, the attribute information received by the MatchID analysis system 106 in step 306 may further include frequencies of occurrence for each attribute combination in a predetermined period of time (e.g., past few days or past few weeks). Table 4 below illustrates a master table that stores frequencies of occurrence for each attribute combination:

TABLE 4

| MatchID | User ID | IP Addresses | Model | Frequency | Timestamp |
|---|---|---|---|---|---|
| 123 | A | 1.2.3.4 | iPhone7 | 8 | 2016-01-06 20:34:25 UTC |
|  |  | 2.3.4.5 |  | 7 | 2016-01-08 18:29:25 UTC |
|  |  | 3.4.5.6 |  | 7 | 2016-01-23 23:49:39 UTC |
| 123 | B | 1.2.3.4 | MacBook | 4 | 2016-01-16 20:34:25 UTC |
|  |  | 2.3.4.5 |  | 9 | 2016-01-26 00:43:32 UTC |
| 123 | C | 1.2.3.4 | GalaxyTab | 2 | 2016-01-26 22:03:25 UTC |

Such additional information may be advantageous in situations in which two or more candidate clusters have the same amount of matching attribute combinations. Accordingly, in response to determining that more than one candidate cluster has the highest number of matching attributes (decision block 330, "No" branch), at step 334, the MatchID analysis system 106 may assign the persistent master identifier to the cluster having attribute combinations that have been observed most frequently, which may be determined based on the stored timestamp information. In an embodiment of the present invention, if none of the attribute information helps to break the tie between the candidate clusters, the MatchID analysis system 106 may randomly select one of the candidate clusters at step 334.

As shown in FIG. 3, each time the MatchID analysis system 106 assigns a persistent master identifier (steps 314, 318, 320, 328, 332, 334) the master table is updated in step 322 and the MatchID analysis system 106 returns to step 306 and processes next received batch of the candidate clusters.

Advantageously, the various embodiments described herein provide a system for creating and maintaining a persistent master identifier for volatile or distinct clusters of user identifiers that are attributed to the same person. In the aforementioned embodiments, the system receives clusters of user identifiers stripped of personally identifiable information and looks for patterns linking one user device to another. In various embodiments, user identifiers may comprise any suitable unique identifiers. Furthermore, the automated system disclosed herein is configured to analyze the frequency of associations between user identifier attributes to determine the individual associations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for maintaining a persistent master identifier for a master table across a plurality of devices in order to provide advertising to one or more users associated with the plurality of devices, the method comprising, by at least one hardware processor, the steps of:
   receiving from one or more servers, at a first time, a first plurality of clusters comprising a first plurality of user device identifiers that identifies at least one user device and at least one first cluster attribute associated with each of the first plurality of user device identifiers;
   storing the first plurality of user device identifiers in one or more storage devices as separate entries in the master table, wherein each entry in the master table includes at least a persistent master identifier uniquely identifying one of the first plurality of clusters, a user device identifier contained within the identified cluster, and the at least one attribute associated with the user device identifier;
   receiving from the one or more servers, at a second time later than the first time, a second plurality of clusters comprising a second plurality of user device identifiers that identifies at least one user device and at least one second cluster attribute associated with each of the second plurality of user device identifiers;
   by the at least one hardware processor to determining, at the second time, persistence of each entry in the master table based on at least one comparison between the second plurality of clusters and the entries in the master table;
   by the at least one hardware processor, selectively associating, at the second time, the second plurality of clusters with a persistent master identifier based on the comparison; and
   for clusters in the second plurality of clusters not having a match based on the at least one comparison between the second plurality of clusters, assigning at the second time, by the at least one hardware processor, a new persistent master identifier for each of the clusters in the second plurality of clusters not having a match in the master table, wherein the new persistent master identifier is a master identifier which had not yet been created.

2. The method of claim 1, wherein the first plurality of clusters is associated with a first time instant and the second plurality of clusters is associated with a second time instant.

3. The method of claim 1, wherein the step of determining persistence further comprises determining for each user device identifier contained within each of the second plurality of clusters whether the user device identifier matches any of the user device identifiers stored in the master table.

4. The method of claim 3, wherein the step of selectively associating further comprises associating a cluster in the second plurality of clusters with a persistent master identifier of a cluster associated with the matching user device identifier in the master table, in response to determining that the matching user device identifiers are contained within only one cluster of the second plurality of clusters.

5. The method of claim 3, wherein the step of selectively associating further comprises:
   determining, for each cluster containing matching user device identifier in the master table, a number of matching user device identifiers for each matching cluster in the second plurality of clusters, in response to determining that the matching user device identifiers are contained within more than one cluster of the second plurality of clusters;
   determining if one of the matching clusters in the second plurality of clusters has a highest number of matching user device identifiers; and
   associating the cluster having the highest number of matching user device identifiers with a persistent master identifier of a corresponding cluster associated with the matching user device identifier in the master table, in response to determining that one of the matching clusters in the second plurality of clusters has the highest number of matching user device identifiers.

6. The method of claim 5, wherein the step of selectively associating further comprises:
selecting a cluster from the matching clusters having the highest number of matching user device identifiers in the second plurality of clusters based on heuristic information, in response to determining that more than one of the matching clusters in the second plurality of clusters has the highest number of matching user device identifiers; and
associating the selected cluster with a persistent master identifier of a corresponding cluster associated with the matching user device identifier in the master table.

7. The method of claim 6, wherein the heuristic information comprises a type of each user device identifier included in a cluster and a cluster size.

8. The method of claim 3, wherein the step of determining persistence further comprises comparing the at least one attribute associated with each of the second plurality of user device identifiers with the at least one attribute associated with the user device identifiers stored in the master table, in response to determining that none of the second plurality of user device identifiers match the user device identifiers stored in the master table.

9. The method of claim 8, wherein the step of determining persistence further comprises determining if at least one attribute associated with one of the second plurality of user device identifiers matches at least one attribute associated with the user device identifiers stored in the master table.

10. The method of claim 9, further comprising generating persistent master identifiers and associating the generated persistent master identifiers with each cluster in the second plurality of clusters, in response to determining no attribute associated with the second plurality of user device identifiers matches any attributes associated with the user device identifiers stored in the master table.

11. The method of claim 8, wherein the step of selectively associating further comprises:
determining, for each cluster containing matching attributes in the master table, a number of matching attributes in each matching cluster in the second plurality of clusters, in response to determining that the matching attributes are contained within one or more clusters of the second plurality of clusters;
determining if one matching cluster in the second plurality of clusters has a highest number of matching attributes; and
associating the cluster having the highest number of matching attributes in the second plurality of clusters with a persistent master identifier of a corresponding cluster associated with the one or more matching attributes in the master table, in response to determining that only one matching cluster in the second plurality of clusters has the highest number of matching attributes.

12. The method of claim 11, wherein the step of selectively associating further comprises:
determining time stamp information associated with each matching attribute, for each cluster having the highest number of matching attributes in the second plurality of clusters, in response to determining that more than one cluster of the second plurality of clusters has the highest number of matching attributes;
selecting one cluster having a most frequently observed attribute based on the time stamp information from the more than one cluster of the second plurality of clusters having the highest number of matching attributes; and
associating the selected cluster with a persistent master identifier of a corresponding cluster associated with the matching attribute in the master table.

13. A non-transitory computer-readable medium and one or more computer-readable storage devices storing instructions for maintaining a persistent master identifier for a master table across a plurality of devices in order to provide advertising to one or more users associated with the plurality of devices, the instructions comprising:
receiving from one or more servers, at a first time, a first plurality of clusters comprising a first plurality of user device identifiers that identifies at least one user device and at least one attribute associated with each of the first plurality of user device identifiers;
storing in the one or more storage devices the first plurality of user device identifiers as separate entries in the master table, wherein each entry in the master table includes at least a persistent master identifier uniquely identifying one of the first plurality of clusters, a user device identifier contained within the identified cluster, and the at least one attribute associated with the user device identifier;
receiving from one or more servers, at a second time later than the first time, a second plurality of clusters comprising a second plurality of user device identifiers that identifies at least one user device and at least one attribute associated with each of the second plurality of user device identifiers;
one or more processors determining, at the second time, persistence of each entry in the master table based on at least one comparison between the second plurality of clusters and the entries in the master table;
the one or more processors selectively associating, at the second time, the second plurality of clusters with a persistent master identifier based on the at least one comparison; and
for clusters in the second plurality of clusters not having a match based on the at least one comparison between the second plurality of clusters, assigning, with the one or more processors, a new persistent master identifier for each of the clusters in the second plurality of clusters not having a persistence in the master table, wherein the new persistent master identifier is a master identifier which had not yet been created.

14. The non-transitory computer-readable medium of claim 13, wherein the instructions to determine persistence further comprise instructions to determine for each user device identifier contained within each of the second plurality of clusters whether the user device identifier matches any of the user device identifiers stored in the master table.

15. The non-transitory computer-readable medium of claim 14, wherein the instructions to selectively associate further comprise instructions to associate a cluster in the second plurality of clusters with a persistent master identifier of a cluster associated with the matching user device identifier in the master table, in response to determining that the matching user device identifiers are contained within only one cluster of the second plurality of clusters.

16. The non-transitory computer-readable medium of claim 14, wherein the instructions to selectively associate further comprise:
determining, for each cluster containing matching user device identifier in the master table, a number of matching user device identifiers for each matching cluster in the second plurality of clusters, in response to determining that the matching user device identifiers are contained within more than one cluster of the second plurality of clusters;

determining if one of the matching clusters in the second plurality of clusters has a highest number of matching user device identifiers; and associating the cluster having the highest number of matching user device identifiers with a persistent master identifier of a corresponding cluster associated with the matching user device identifier in the master table, in response to determining that one of the matching clusters in the second plurality of clusters has the highest number of matching user device identifiers.

17. The non-transitory computer-readable medium of claim 16, wherein the instructions to selectively associate further comprise:

selecting a cluster from the matching clusters having the highest number of matching user device identifiers in the second plurality of clusters based on heuristic information, in response to determining that more than one of the matching clusters in the second plurality of clusters has the highest number of matching user device identifiers; and associating the selected cluster with a persistent master identifier of a corresponding cluster associated with the matching user device identifier in the master table.

18. The non-transitory computer-readable medium of claim 17, wherein the heuristic information comprises a type of each user device identifier included in a cluster and a cluster size.

19. A system for maintaining a persistent master identifier for a master table across a plurality of devices in order to provide advertising to one or more users associated with the plurality of device, the system comprising one or more processors, one or more computer-readable storage devices, and a plurality of instructions stored on at least one of the one or more storage devices for execution by at least one of the one or more processors, the plurality of instructions comprising:

receiving from one or more servers, at a first time, a first plurality of clusters comprising a first plurality of user device identifiers that identifies at least one user device and at least one attribute associated with each of the first plurality of user device identifiers;

storing the first plurality of user device identifiers in the one or more storage devices as separate entries in the master table, wherein each entry in the master table includes at least a persistent master identifier uniquely identifying one of the first plurality of clusters, a user device identifier contained within the identified cluster, and the at least one attribute associated with the user device identifier;

receiving from the one or more servers, at a second time later than the first time, a second plurality of clusters comprising a second plurality of user device identifiers that identifies at least one user device and at least one attribute associated with each of the second plurality of user device identifiers;

the one or more processors determining, at the second time, persistence of each entry in the master table based on at least one comparison between the second plurality of clusters and the entries in the master table;

the one or more processors selectively associating, at the second time, the second plurality of clusters with a persistent master identifier based on the comparison; and for clusters in the second plurality of clusters not having a match based on the at least one comparison between the second plurality of clusters, assigning, with the one or more processors, at the second time, a new persistent master identifier for each of the clusters in the second plurality of clusters not having a persistence in the master table, wherein the new persistent master identifier is a master identifier which had not yet been created.

20. The computer system of claim 19, wherein the instructions to determine persistence further comprise instructions to determine for each user device identifier contained within each of the second plurality of clusters whether the user device identifier matches any of the user device identifiers stored in the master table.

* * * * *